United States Patent
Morgan et al.

(10) Patent No.: US 8,326,966 B2
(45) Date of Patent: *Dec. 4, 2012

(54) EFFICIENT, CENTRALIZED MANAGEMENT OF APPLICATION LOG CONFIGURATION SETTINGS

(75) Inventors: Fabian F. Morgan, Austin, TX (US); Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1574 days.

This patent is subject to a terminal disclaimer.

(21) Appl. No.: 11/291,548

(22) Filed: Dec. 1, 2005

(65) Prior Publication Data

US 2007/0130320 A1    Jun. 7, 2007

(51) Int. Cl.
*G06F 15/16* (2006.01)
*G06F 9/44* (2006.01)

(52) U.S. Cl. ......... 709/224; 709/223; 717/124; 717/127

(58) Field of Classification Search .................. 709/223, 709/224; 717/128
See application file for complete search history.

(56) References Cited

U.S. PATENT DOCUMENTS

| | | | |
|---|---|---|---|
| 5,471,526 A | 11/1995 | Linnermark et al. | |
| 5,790,977 A * | 8/1998 | Ezekiel | 702/122 |
| 6,083,281 A | 7/2000 | Diec et al. | |
| 6,202,199 B1 * | 3/2001 | Wygodny et al. | 717/125 |
| 6,266,709 B1 | 7/2001 | Gish | |
| 6,282,701 B1 | 8/2001 | Wygodny et al. | |
| 6,357,019 B1 * | 3/2002 | Blaisdell et al. | 714/38 |
| 6,553,403 B1 | 4/2003 | Jarriel et al. | |
| 6,738,965 B1 * | 5/2004 | Webster | 717/128 |
| 7,039,921 B2 | 5/2006 | Shah et al. | |
| 7,114,104 B1 | 9/2006 | Bennett | |
| 7,206,385 B2 * | 4/2007 | Ethier et al. | 379/32.05 |
| 7,996,822 B2 | 8/2011 | Phillips | |
| 2003/0005021 A1 | 1/2003 | Shah et al. | |
| 2003/0200301 A1 * | 10/2003 | Trzcinko et al. | 709/223 |
| 2004/0260758 A1 | 12/2004 | Hirata et al. | |
| 2005/0222817 A1 * | 10/2005 | Achacoso et al. | 702/185 |
| 2007/0130119 A1 | 6/2007 | Phillips | |

FOREIGN PATENT DOCUMENTS

GB    2365553 A    2/2002

OTHER PUBLICATIONS

U.S. Appl. No. 11/291,542, filed Dec. 1, 2005, Phillips.
Wolczko, "Using a Tracing Java Virtual Machine to Gather Data on the Behavior of Java Programs", Mar. 1999, pp. 1-14, retrieved Apr. 6, 2006 http://research.sun.com/people/mario/tracing-jvm/tracing.pdf.

(Continued)

*Primary Examiner* — Benjamin R Bruckart
(74) *Attorney, Agent, or Firm* — Yee & Associates, P.C.; Mark C. Vallone

(57) ABSTRACT

A log manager for tracing a user or process in a data processing system is provided. A user inputs various criteria in the log manager, indicating exactly what is to be traced. A tracer key is created based on this information. The tracer key is then transmitted to the appropriate applications in the system, which then gather the relevant information. The applications then forward this information to a log receiver. The receiver stores the information. The log receiver can then produce a trace report for the user at any time the user wishes.

20 Claims, 3 Drawing Sheets

OTHER PUBLICATIONS

USPTO Office Action for U.S. Appl. No. 11/291,542 dated Aug. 4, 2010.
Office Action, dated Apr. 30, 2009, regarding U.S. Appl. No. 11/291,542, 30 pages.
Final Office Action, dated Oct. 15, 2009, regarding U.S. Appl. No. 11/291,542, 13 pages.
Appeal Brief, dated Mar. 15, 2010, regarding U.S. Appl. No. 11/291,542, 29 pages.
Notice of Allowance, dated Apr. 1, 2011, regarding U.S. Appl. No. 11/291,542, 11 pages.

* cited by examiner

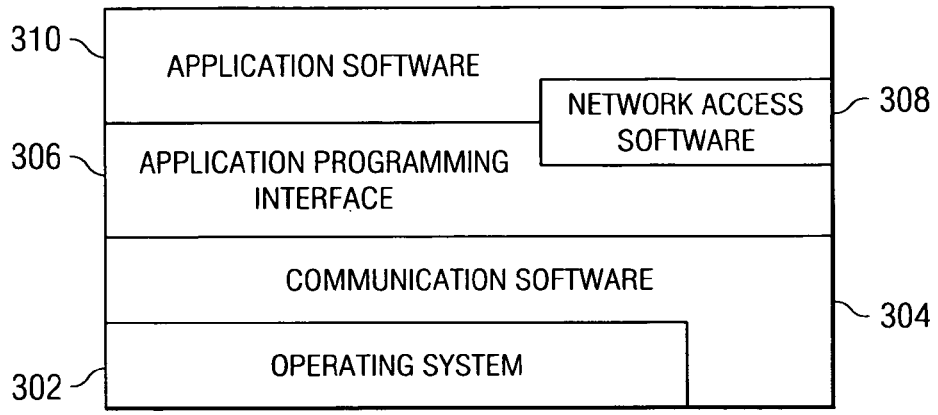
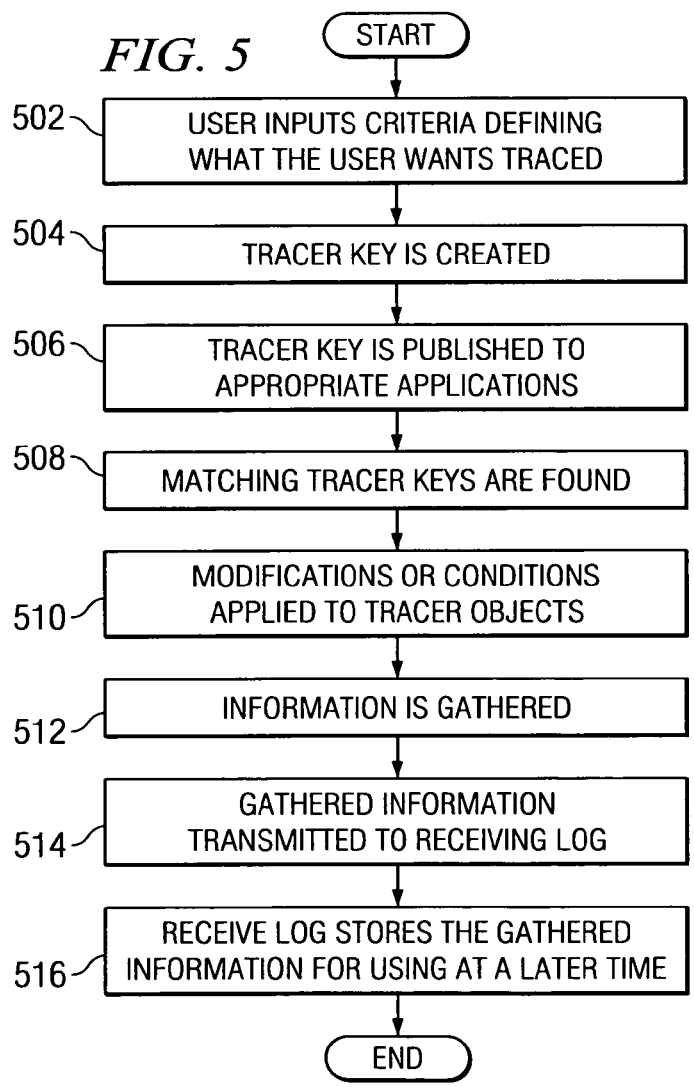

EFFICIENT, CENTRALIZED MANAGEMENT OF APPLICATION LOG CONFIGURATION SETTINGS

BACKGROUND OF THE INVENTION

1. Field of the Invention

The present invention relates generally to data processing systems and, in particular, to a method, system, and computer program product for management of application log configuration settings in a data processing system.

2. Description of the Related Art

Modern computing technology has resulted in immensely complicated and ever-changing environments. One such environment is the Internet, which is also referred to as an "internetwork." The Internet is a set of computer networks, possibly dissimilar, joined together by means of gateways that handle data transfer and the conversion of messages from a protocol of the sending network to a protocol used by the receiving network. When capitalized, the term "internet" refers to a collection of networks and gateways that use the TCP/IP suite of protocols. Currently, the most commonly employed method of transferring data over the Internet is to employ the World Wide Web environment, also called the "Web". Other internet resources exist for transferring information, such as File Transfer Protocol (FTP) and Gopher, but have not achieved the popularity of the Web. In the Web environment, servers and clients effect data transactions using the Hypertext Transfer Protocol (HTTP), a known protocol for handling the transfer of various data files such as text, still graphic images, audio, motion video, etc. HTTP is made up of header information and content. HTTP allows for the creation of custom headers. The information in various data files is formatted for presentation to a user by a standard page description language, the Hypertext Markup Language (HTML). The Internet also is used widely to transfer applications to users using browsers. Often times, users may search for and obtain software packages through the Internet.

Other types of complex network data processing systems include those created for facilitating work in large corporations. In many cases, these networks may span across regions in various worldwide locations. These complex networks also may use the Internet as part of a virtual private network for conducting business. These networks are further complicated by the need to collect and analyze data concerning software application errors that occur within the network.

Often, software applications exhibit problems that only occur in a specific customer environment. This makes duplication of the problem in a controlled environment difficult if not impossible until the nature of the problem is determined. Unfortunately, the information necessary to isolate the exact nature of the problem can be difficult to obtain because enabling logging and/or trace information can significantly modify the runtime behavior of the system.

Currently, the only way to run a trace is turn on a full debug for all users or processes. Having the ability to trace a single user or process, or a limited subset of users or processes, limits the additional overhead of logging than turning on a full debug for all users or processes.

SUMMARY OF THE INVENTION

The present invention provides a method, system, and computer program product for management of application log configuration settings in a data processing system. User input is received. A tracer key is created based on the user input. The tracer key is then published to one or more applications. Responsive to the information associated with the tracer key being traced, the traced information is transmitted to a receiving application. The traced information is then stored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram depicting typical software architecture for a server-client system in which exemplary aspects of the present invention may be implemented;

FIG. 5 is a flowchart illustrating the operation of debug tracing in accordance with an exemplary embodiment of the present invention.

DETAILED DESCRIPTION OF THE PREFERRED EMBODIMENT

Figure 1:
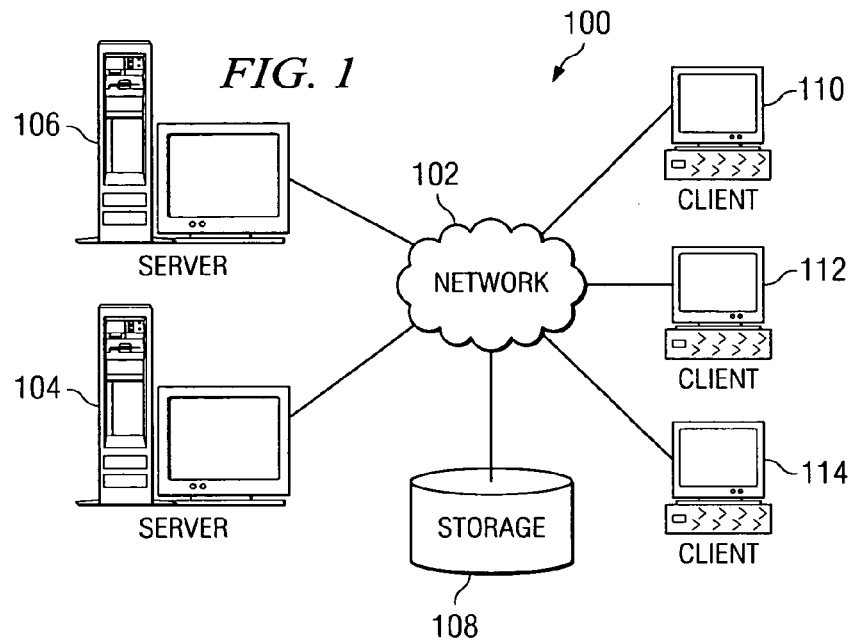
FIG. 1 is a pictorial representation of a network of data processing systems in which exemplary aspects of the present invention may be implemented.
Figure 2:
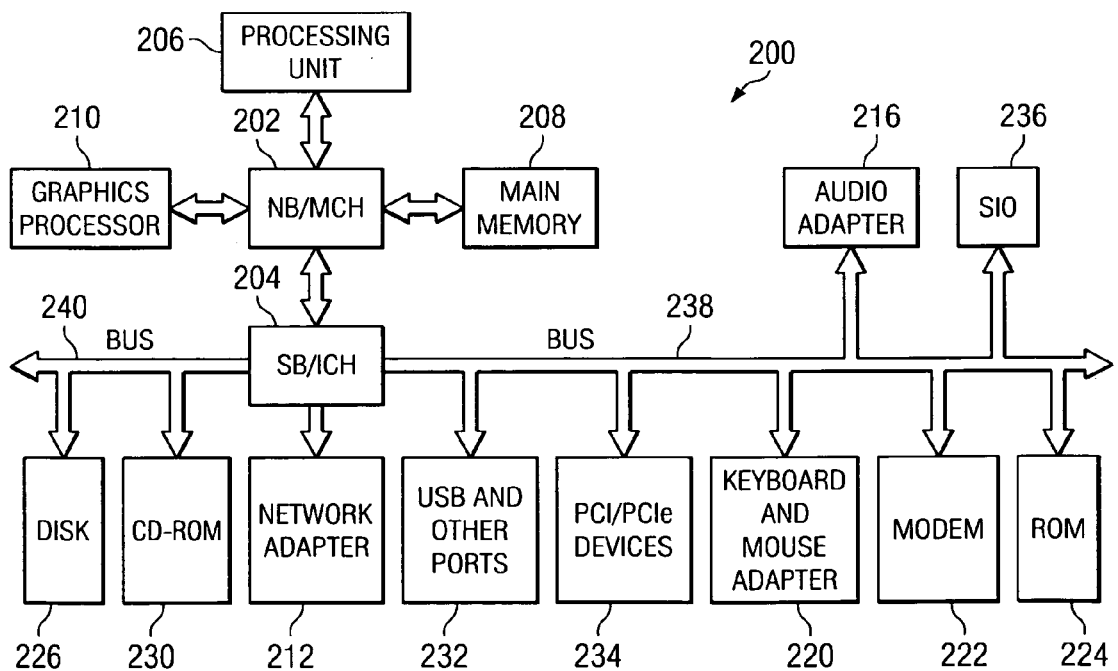
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Turning to FIG. 3, typical software architecture for a server-client system is depicted in which exemplary aspects of the present invention may be implemented. At the lowest level, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Figure 4:
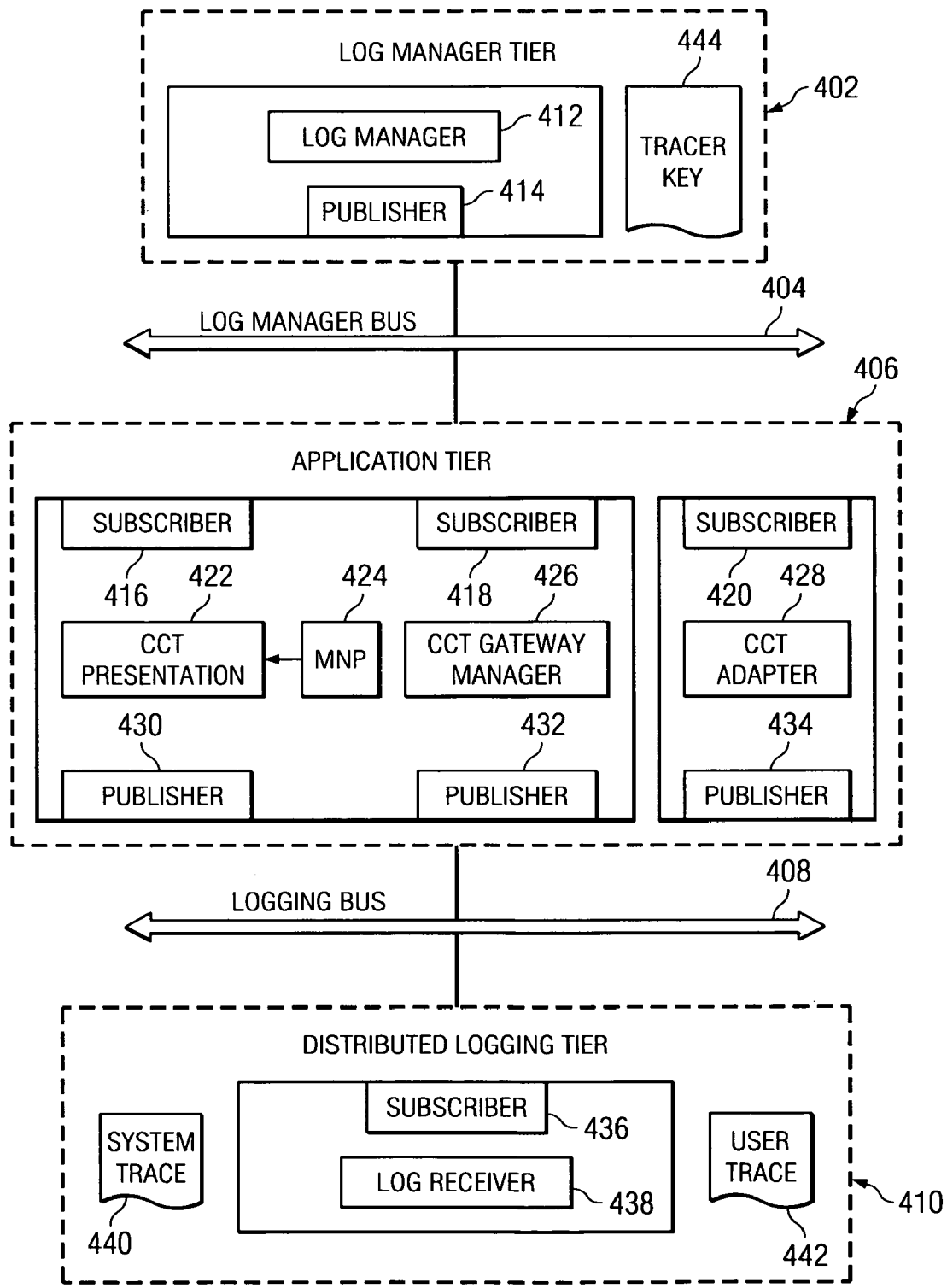
FIG. 4 is a block diagram depicting a system allowing a full debug level tracing in accordance with an exemplary embodiment of the present invention.

Application software 310 represents any number of software applications designed to react to data through the communications port to provide the desired functionality the user seeks, such as log manager 412 or log receiver 438 in FIG. 4. Applications at this level may include those necessary to handle data, video, graphics, photos or text, which can be accessed by users of the Internet.

Tracking system errors can be difficult, particularly in a production system. Often full level debugging tracing impacts system performance. Filters can be used but this impacts system performance as each debug message needs to be considered and accepted or rejected, as the case may be, by the filter. By tracing an individual user or process, performance issues can be reviewed at a very low level with a limited increase to overhead or impact on the performance of the general system.

In an exemplary embodiment of the present invention, a log manager is created for managing the configuration settings and tracing of data in applications. Through a user interface, the log manager allows for the creating of a tracer key, which is a document, application, or file that contains information about what the user wants traced and how the user wants it reported. For example, the tracer key could say trace user XYZ when using application A and publish the results to a specific e-mail account every 15 minutes.

The log manager publishes the tracer key to all applications that subscribe to the log manager. The applicable applications then gather the requested information and publish the results. In a default setting, the information is published to a log receiver which stores the information and may then produce reports for a user, as the user desires.

FIG. 4 is a block diagram depicting a system allowing a full debug level tracing in accordance with an exemplary embodiment of the present invention. In an exemplary embodiment of the present invention the debug system comprises three tiers, log manager tier 402, application tier 406 and distributed logging tier 410. Log manager tier 402 communicates with application tier 406 through log manager bus 404. Application tier 406 communicates with distributed logging tier 410 through logging bus 408. Log manager tier 402 comprises log manager 412 and publisher 414.

In an exemplary embodiment of the present invention log manager 412 is implemented as a web page. A user fills out information on log manager 412 regarding what person or process is to be traced. Any combination of attributes can be traced from an individual user or user identification, to a specific process or program or even a specific user running a specific program. Once a user selects who or what is to be traced, tracer key 444 is created. Publisher 414 publishes tracer key 444 to subscribing programs in application tier 406 through subscribers 416, 418 and 420.

Application tier 406 comprises subscribers 416, 418, 420, common component technology (CCT) presentation 422, manage now problem (MNP) 424, CCT gateway manager 426, CCT adapter 428, and publishers 430, 432, and 434. CCT presentation 422, MNP 424, CCT gateway manager 426 and CCT adapter 428 are examples of types of components or software that may be traced or included in the tracing program. These programs are not necessary to the implementation of the present invention and are merely used for the present illustrative example and are not intended to imply any architectural limitation of the present invention, as any number of components could be included in the system. For example, rather than the multiple components shown in the present example, only one component may be involved in tracing. As a default setting, after the required information has been gathered by the various components, the information is passed on to distributed logging tier 410 by publishers 430, 432, and 434. However, rather than publishing the information to logging tier 410, the gathered information could be passed in a variety of ways, such as by e-mail and or by saving the information to a specific file, etc.

Distributed logging tier 410 comprises subscriber 436, log receiver 438, system trace 440, and user trace 442. Subscriber 436 collects the tracing information and passes it to log receiver 438. Log receiver 438 parses all the information received and produces reports to be examined. In the depicted example system trace 440 contains general errors, default errors and error messages. User trace 442 is a report of the trace being performed.

In the depicted example, all the components may be implemented on the same data processing system or each component may be implemented on separate data processing systems, or any combination thereof. FIG. 5 is a flowchart illustrating the operation of debug tracing in accordance with an exemplary embodiment of the present invention. The operation begins when a user inputs the criteria regarding what the user wants traced (step 502). A tracer key is created (step 504). The tracer key is published to the appropriate applications (step 506). Matching tracer keys are found (step 508). The tracer key maps to the tracer object and applies appropriate conditions or modifications (step 510). The tracer object then gathers the requested information (step 512). The gathered information is passed on to another application, such as a receiving log, which collects the information (step 514). The receiving log stores the gathered information for viewing at a later time (step 516) and the process ends.

Thus the present invention allows the tracing at a very specific level, such as on a user identification, on a session, correlation, application, instance, process or thread identifier. The tracer object records information regarding the specified user or process and stores the information in a central location where the information may be examined at a later time.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, or store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for management of application log configuration settings in a data processing system, the computer implemented method comprising:
   receiving, by the data processing system, user input for application debug tracing via a log manager;
   creating, by the data processing system, a tracer key based on the user input for the application debug tracing, wherein the tracer key identifies what application debug information is to be traced and how to report traced application debug information;
   transmitting, by the data processing system, the tracer key to all of a plurality of subscriber applications that subscribe to the log manager via a network, wherein the plurality of subscriber applications reside on a plurality of remote data processing systems; and
   responsive to the application debug information associated with the tracer key being traced by applicable applications having matching tracer keys within the plurality of subscriber applications, receiving, by the data processing system via the network, traced application debug information transmitted from the remote data processing systems with the applicable applications having matching tracer keys.

2. The computer implemented method of claim 1, wherein the data processing system receives the traced application debug information using an electronic mail application.

3. The computer implemented method of claim 1, wherein the data processing system uses a receiving application for storing the traced application debug information.

4. The computer implemented method of claim 1, wherein the user input comprises a user identification for tracing information regarding utilization of the subscriber applications by a user associated with the user identification.

5. The computer implemented method of claim 1, further comprising:
   producing an error report for a user, wherein the error report includes the traced application debug information.

6. The computer implemented method of claim 3, wherein the receiving application for storing the traced application debug information is on one of the plurality of remote data processing systems.

7. The computer implemented method of claim 1, wherein the log manager is implemented as a web page.

8. A computer program product stored in a computer usable storage medium including computer usable program code embodied therein for management of application log configuration settings, said computer program product comprising:
   computer usable program code for receiving user input for application debug tracing via a log manager;
   computer usable program code for creating a tracer key based on the user input for the application debug tracing, wherein the tracer key identifies what application debug information is to be traced and how to report traced application debug information;
   computer usable program code for transmitting the tracer key to all of a plurality of subscriber applications that subscribe to the log manager via a network, wherein the plurality of subscriber applications reside on a plurality of remote data processing systems; and
   computer usable program code, responsive to the application debug information associated with the tracer key being traced by applicable applications having matching tracing keys within the plurality of subscriber applications, for receiving traced application debug information transmitted from the remote data processing systems with the applicable applications having matching tracing keys.

9. The computer program product of claim 8, wherein the computer usable program code for receiving the traced application debug information transmitted from the remote data processing systems with the applicable applications having matching keys receive the traced application debug information using an electronic mail application.

10. The computer program product of claim 8, further comprising computer usable program code for utilizing a receiving application for storing the traced application debug information.

11. The computer program product of claim 8, wherein the user input comprises a user identification for tracing information regarding utilization of the subscriber applications by a user associated with the user identification.

12. The computer program product of claim 8, further comprising:
   computer usable program code for producing an error report for a user, wherein the error report includes the traced application debug information.

13. The computer program product of claim 10, wherein the receiving application for storing the traced application debug information is on one of the plurality of remote data processing systems.

14. The computer program product of claim 8, wherein the log manager is implemented as a web page.

15. A data processing system comprising a computer readable memory, a processor, and a storage device, the storage device containing computer usable program code configured to be executed by the processor via the computer readable memory to implement a method for tracing application debug information, the method comprising:

receiving user input for application debug tracing via a log manager creating a tracer key based on the user input for the application debug tracing, wherein the tracer key identifies what application debug information is to be traced and how to report traced application debug information; transmitting the tracer key to all of a plurality of subscriber applications that subscribe to the log manager via a network, wherein the plurality of subscriber applications reside on a plurality of remote data processing systems; and responsive to the application debug information associated with the tracer key being traced by applicable applications having matching tracing keys within the plurality of subscriber applications, receiving traced application debug information transmitted from the remote data processing systems with the applicable applications having matching tracing keys.

16. The data processing system of claim 15, wherein receiving the traced application debug information transmitted from the remote data processing systems with the applicable applications having matching tracing keys comprises receiving the traced application debug information using an electronic mail application.

17. The data processing system of claim 15, wherein the user input comprises a user identification for tracing information regarding utilization of the subscriber applications by a user associated with the user identification.

18. The data processing system of claim 15, wherein the method further comprises producing an error report for a user, wherein the error report includes the traced application debug information.

19. The data processing system of claim 15, wherein the method further comprises utilizing a receiving application for storing the traced application debug information, and wherein the receiving application for storing the traced application debug information is on one of the plurality of remote data processing systems.

20. The data processing system of claim 15, wherein the log manager is implemented as a web page.

* * * * *